United States Patent [19]

Sauvage

[11] Patent Number: 4,654,097

[45] Date of Patent: Mar. 31, 1987

[54] PROCESS FOR PREPARING BODIES OF ROCKET PROPULSION UNITS

[75] Inventor: Dominique Sauvage, La Taillan Medoc, France

[73] Assignee: Societe Europeenne de Propulsion, France

[21] Appl. No.: 673,577

[22] Filed: Nov. 21, 1984

[51] Int. Cl.$^4$ .................... B65M 81/00; C06B 45/00
[52] U.S. Cl. .................... 156/172; 60/255; 102/289; 102/291; 156/315; 264/3 R; 264/3.1
[58] Field of Search .................. 156/172, 314, 315; 60/255, 200.1; 102/289, 290, 291; 264/3 R

[56] References Cited

U.S. PATENT DOCUMENTS

| | | | |
|---|---|---|---|
| 3,010,354 | 11/1961 | Adelman | 86/1 |
| 3,555,816 | 1/1971 | Leasure, Jr. et al. | 60/255 |
| 3,813,308 | 5/1974 | Skidmore | 102/290 |
| 4,120,153 | 10/1978 | Schaffling | 60/255 |
| 4,389,264 | 6/1983 | Klohn et al. | 149/14 |
| 4,495,764 | 1/1985 | Gnagy | 60/255 |

FOREIGN PATENT DOCUMENTS 2303843  3/1975  France .

*Primary Examiner*—Michael Ball
*Attorney, Agent, or Firm*—Scully, Scott, Murphy & Presser

[57] ABSTRACT

The invention relates to a process for preparing a body of a rocket propulsion unit comprising a rubber wall forming a chamber which contains a propergol and an outer wall forming reinforcement, characterized in that the following steps are carried out:

the rubber chamber is coated with an adhesive agent, the whole is baked at a temperature higher than about 100° C., the propergol is introduced into the chamber, the outer wall is made by depositing impregnated fibers around the chamber and polymerization at a temperature lower than about 100° C.

2 Claims, No Drawings

PROCESS FOR PREPARING BODIES OF ROCKET PROPULSION UNITS

The present invention relates to a process for preparing bodies of rocket propulsion units.

French Patent Application No. 75 08315 filed on Mar. 12, 1975 and published under No. 2 303 843, describes a process for cold bonding of a synthetic or natural material (rubber) on a support, consisting in depositing on the material to be bonded a thin layer of an adhesive agent (or primer), in baking the component constituted by said material coated with said primer, then in bonding the assembly obtained on said support by means of an appropriate glue.

It has been found, and this is the object of the present invention, that the technique of cold bonding described in said Patent Application was especially usable for preparing bodies of rocket propulsion units constituted by a chamber, containing the mixture of solid fuel/oxidant (propergol), made of vulcanized rubber about which is disposed an outer wall made of a reinforced resin.

The process according to the invention is characterized in that the outer surface of the rubber forming the chamber is provided with a layer of an adhesive agent (or primer); said adhesive agent is baked; the propergol is introduced; said reinforced resin is deposited around the chamber thus prepared; and the assembly is baked at a temperature which is sufficient to polymerize said resin but which would be insufficient to effect baking of said adhesive agent.

Rubber which may be used for making the chamber according to the present invention is understood to mean any natural or synthetic rubber whose properties, in the vulcanized state, are compatible with the function performed by said chamber. However, the invention is of course essentially applicable to chambers made with rubbers which are difficult to bond, such as ethylene-propylene copolymers, ethylene-propylenediene (EPDM) copolymers, butyl rubbers (IIR) and chloro sulfonated polyethylenes (CSM).

The rubber is therefore provided on its outer face with an adhesive agent known by specialists as primer. Such a primer is constituted by special resins or mixtures of resins containing fillers and possibly other additives. Such a primer is generally in the form of a solution or dispersion of the ingredients, in a solvent (more generally in a liquid medium).

The rubber must be vulcanized and the primer must be baked to form a usable "coated chamber". These two operations may be carried out simultaneously or successively. It will be noted that the primer must be baked at a temperature greater than about 100° C. (most often between 120° and 130° C.).

The primer-coated chamber thus obtained is then cooled, and the propergol is then poured therein; the chamber is then coated with the reinforced resin.

"Reinforced resin" means a polymer resin comprising reinforcing elements; these elements are most often fibers (glass fibers, fibers of polyamides, aromatic or not, carbon fibers, . . . ). Pre-impregnated fibers will most often be used. However, in addition, the resins which may be used must be selected from the prepolymers which are capable, generally thanks to the use of a suitable catalyst or hardening agent, of polymerizing at a temperature lower than about 100° C., this temperature being chosen to take into account the fact that the propergol, present during this heating, would not withstand a higher temperature without danger. Moreover, the resin must be used on the baked adhesive agent.

This polymerization temperature may be ambient temperature. It will be noted that this temperature of polymerization of the resin is clearly lower than that necessary for vulcanizing the rubber and than the temperature necessary for baking the primer, and this is why these two operations (vulcanization and baking) are carried out before the reinforced resin is deposited.

The following Example illustrates the invention:

a chamber made of vulcanized EPDM (ethylene-propylene-diene rubber) is used; a layer of about 20 microns of a primer marketed under the name of CHEMOSIL X 6070 is deposited on the outer face of this chamber; the whole is baked at 120° C. for about 1 hour;

Kevlar fibers impregnated with resins R are deposited around this chamber coated with baked primer (and in which a propergol has been introduced); the whole is then baked at a temperature T.

CHEMOSIL X 6070 manufactured by HENKEL and marketed in France by SAFIC-ALCAN, is a rubber-to-metal bonding agent and is composed of a mixture of dissolved polymers and dispersed fillers in organic solvents principally xylene.

The following Table shows the various tests run (with success).

| Resin | | Temperature and duration of baking |
|---|---|---|
| CIBA: XB 3052 A (novolak epoxy) | 60 parts by weight | 23° C. - 7 days |
| XB 3052 B (amine hardening agent) | 40 parts by weight | |
| DOW DER 351 (epoxy) | 100 parts by weight | 40° C. - 4 hours |
| JEFFERSON Jeffamine D 230 | 37 parts by weight | |
| Accelerator A 398 | 2 parts by weight | |
| CDF Lopox 200 (epoxy) | 100 parts by weight | 60° C. - 24 hours |
| hardening agent D 302 | 27 parts by weight | |
| CIBA Resin LY 556 epoxy | 100 parts by weight | 80° C. - 24 hours |
| hardening agent HY 906 | 90 parts by weight | |
| accelerator DY070 | 1.5 parts by weight | |

In all cases, a very good adherence is obtained of the outer layer (reinforced resin) on the chamber. The absence of primer or the use of a primer not baked in advance would give a weak or insufficient adherence.

What is claimed is:

1. A process for preparing a rocket propulsion unit body which includes a rubber wall chamber containing a mixture of solid fuel and oxidant and provided with an outer reinforcing wall comprising the steps of:
    coating the outer surface of a rubber chamber with a primer;
    baking said primer coated rubber chamber at a temperature above about 100° C. to cure the primer and to vulcanize the rubber;
    introducing a mixture of solid fuel and oxidant into said baked chamber;
    coating the outer side of said chamber with a resin provided with reinforcing fibers; and
    polymerizing said resin at a temperature below about 100° C., said temperature being insufficient to effect curing of said primer.

2. A process in accordance with claim 1 wherein said primer is compatible with said rubber and said resin is bondable to said baked primer.

* * * * *